United States Patent
Greenberg et al.

(10) Patent No.: US 9,450,873 B2
(45) Date of Patent: Sep. 20, 2016

(54) PERFORMANCE ISOLATION FOR CLOUDS

(75) Inventors: Albert Greenberg, Seattle, WA (US); Alan Shieh, Ithaca, NY (US); Srikanth Kandula, Redmond, WA (US); Changhoon Kim, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 760 days.

(21) Appl. No.: 13/171,398

(22) Filed: Jun. 28, 2011

(65) Prior Publication Data

US 2013/0003538 A1    Jan. 3, 2013

(51) Int. Cl.
*H04L 12/801* (2013.01)
*H04L 12/863* (2013.01)

(52) U.S. Cl.
CPC ............ *H04L 47/12* (2013.01); *H04L 47/623* (2013.01)

(58) Field of Classification Search
CPC ............... H04L 2012/5637; H04L 2012/568; H04L 2012/5681; H04L 47/12; H04L 47/623; H04Q 11/0478
USPC ................. 370/230; 709/224, 225, 226
See application file for complete search history.

(56) References Cited

U.S. PATENT DOCUMENTS

| | | | |
|---|---|---|---|
| 7,290,259 B2 | 10/2007 | Tanaka et al. | |
| 7,308,687 B2 | 12/2007 | Trossman et al. | |
| 8,462,632 B1* | 6/2013 | Vincent | H04L 47/30 370/235 |
| 2002/0049608 A1* | 4/2002 | Hartsell et al. | 705/1 |
| 2003/0198190 A1* | 10/2003 | Rajan | H04L 45/12 370/252 |
| 2006/0250964 A1* | 11/2006 | Vasseur | H04L 45/10 370/238 |
| 2007/0098006 A1* | 5/2007 | Parry | H04L 12/4633 370/437 |
| 2008/0298237 A1* | 12/2008 | Dos Remedios | H04L 12/5695 370/233 |
| 2009/0204723 A1* | 8/2009 | Tonsing | H04L 12/5602 709/238 |
| 2010/0036903 A1 | 2/2010 | Ahmad et al. | |
| 2010/0107162 A1 | 4/2010 | Edwards et al. | |
| 2010/0138830 A1 | 6/2010 | Astete et al. | |
| 2010/0142421 A1* | 6/2010 | Schlicht | H04W 4/20 370/310 |
| 2011/0242974 A1* | 10/2011 | Das | H04L 47/781 370/230 |
| 2011/0276951 A1* | 11/2011 | Jain | G06F 11/3006 717/140 |
| 2011/0295999 A1* | 12/2011 | Ferris | G06F 9/5072 709/224 |
| 2012/0076149 A1* | 3/2012 | Ko | H04L 12/433 370/395.53 |
| 2012/0209705 A1* | 8/2012 | Ramer | G06F 17/30867 705/14.51 |
| 2012/0303322 A1* | 11/2012 | Rego | G06F 11/3495 702/182 |
| 2012/0329401 A1* | 12/2012 | Wegmann | H04L 41/0803 455/67.11 |

OTHER PUBLICATIONS

Banks, et al., "Multi-tenancy in Cloud-based Collaboration Services", Retrieved at <<http://www.hpl.hp.com/techreports/2009/HPL-2009-17.pdf>>, HP Laboratories, HPL-2009-17, Feb. 21, 2009, pp. 5.

(Continued)

*Primary Examiner* — Khaled Kassim

(74) *Attorney, Agent, or Firm* — Henry Gabryjelski; Kate Drakos; Micky Minhas

(57) ABSTRACT

Traffic in a cloud is controlled by the nodes participating in the cloud. Tenants of the cloud each have a ratio. On any given node, a current transmission rate of the node is allocated among the tenants of the node, or more specifically, their execution units (e.g., virtual machines) on the node. Thus each tenant receives a predefined portion of the transmission capacity of the node. The transmission capacity can vary as conditions on the network change. For example, if congestion occurs, the transmission capacity may be decreased. Nonetheless, each tenant receives, according to its ratio, a same relative portion of the overall transmission capacity.

14 Claims, 8 Drawing Sheets

(56) References Cited

OTHER PUBLICATIONS

"Sun Datacenter Infiniband Switch 36", Retrieved at <<http://www.oracle.com/us/products/servers-storage/networking/infiniband/046258.pdf>>, Retrieved Date: Jul. 12, 2010, pp. 3.
"Architecting Scalable Multi-tenant Infrastructure with NetScaler VPX Virtual Appliances", Retrieved at <<http://www.citrix.com/%2Fsite%2Fresources%2Fdynamic%2Fsalesdocs%2FFlex_Tenancy_Multi_Tenancy.pdf>>, Retrieved Date: Jul. 12, 2010, pp. 15.
"Ntttcp to test network performance", Retrieved at <<http://www.microsoft.com/whdc/device/network/tcp_tool.mspx>>, Retrieved Date: Jul. 13, 2010, pp. 1.
Al-Fares, et al., "A Scalable, Commodity Data Center Network Architecture", Retrieved at <<http://ccr.sigcomm.org/online/files/p63-alfares.pdf>>, ACM SIGCOMM Computer Communication Review, vol. 38, No. 4, Oct. 2008, pp. 63-74.
"Amazon Web Services", Retrieved at <<http://aws.amazon.com/>>, Jul. 12, 2010, p. 1.
Andersen, et al., "System Support for Bandwidth Management and Content Adaptation in Internet Applications", Retrieved at <<http://www.cs.cmu.edu/~dga/papers/cm-osdi2000.pdf>>, Proceedings of the 4th conference on Symposium on Operating System Design & Implementation—vol. 4, 2000, pp. 14.
Armbrust, et al., "Above the Clouds: A Berkeley View of Cloud Computing", Retrieved at <<http://www.eecs.berkeley.edu/Pubs/TechRpts/2009/EECS-2009-28.pdf>>, Technical Report No. UCB/EECS-2009-28, Feb. 10, 2009, pp. 25.
Barham, et al., "Xen and the Art of Virtualization", Retrieved at <<http://www.cl.cam.ac.uk/research/srg/netos/papers/2003-xensosp.pdf>>, Proceedings of the nineteenth ACM symposium on Operating systems principles, Oct. 19-22, 2003, pp. 14.
Claybrook, Bill., "Comparing cloud risks and virtualization risks for data center apps", Retrieved at <<http://searchdatacenter.techtarget.com/tip/0,289483,sid80_gci1380652,00.html>>, Feb. 3, 2010, pp. 5.
"BitBucket", Retrieved at <<http://blog.bitbucket.org/2009/10/04/on-ourextended-downtime-amazon-and-whats-coming/>>, Retrieved Date: Jul. 7, 2010, pp. 1.
Hopps, C., "Analysis of an Equal-Cost Multi-Path Algorithm", Retrieved at <<http://tools.ietf.org/pdf/rfc2992.pdf>>, NextHop Technologies, Nov. 2000, pp. 9.
Chen, et al., "Whats New About Cloud Computing Security", Retrieved at <<http://www.eecs.berkeley.edu/Pubs/TechRpts/2010/EECS-2010-5.pdf>>, Electrical Engineering and Computer Sciences University of California at Berkeley, Technical Report No. UCB/EECS-2010-5, Jan. 20, 2010, pp. 8.
"Cisco Nexus 1000V Series Switches", Retrieved at <<http://www.cisco.com/en/US/products/ps9902/>>, Retrieved Date Jul. 12, 2010, pp. 2.
"Cisco Nexus 7000 Series Switches", Retrieved at <<http://www.cisco.com/en/US/products/ps9402/index.html>>, Retrieved Date Jul. 12, 2010, pp. 2.
Dixon, C.,et al., "An End to the Middle", Retrieved at <<http://www.cs.washington.edu/homes/ckd/ettm.pdf>>, Proceedings of the 12th conference on Hot topics in operating systems, 2009, pp. 5.
Dong, Y., et al., "SR-IOV Networking in Xen: Architecture, Design and Implementation", Retrieved at <<http://www.usenix.org/event/wiov08/tech/full_papers/dong/dong.pdf>>, Proceedings of the First conference on I/O virtualization, 2008, pp. 7.
Garfinkel, Simson L., "An Evaluation of Amazon's Grid Computing Services: EC2, S3 and SQS", Retrieved at <<http://citeseerx.ist.psu.edu/viewdoc/download;jsessionid=7F4AEAFD038F52 CAAFB43E97E829964C?doi=10.1.1.155.1138&rep=rep1&type=pdf>>, Technical Report Aug. 2007, pp. 15.
Greenberg, et al., "VL2: A Scalable and Flexible Data Center Network", Retrieved at <<http://research.microsoft.com/pubs/80693/vl2-sigcomm09-final.pdf>>, SIGCOMM'09, Aug. 17-21, 2009, pp. 12.
Gude, et al., "NOX: Towards an Operating System for Networks", Retrieved at <<http://www.cs.yale.edu/homes/jf/nox.pdf>>, ACM SIGCOMM Computer Communication Review, vol. 38 No. 3, Jul. 2008, pp. 6.
"IEEE. 802.1Qaz—Enhanced Transmission Selection", Retrieved at <<http://www.ieee802.org/1/pages/802.1az.html>>, Retrieved Date Jul. 12, 2010, pp. 5.
Kallahalla, M., et al., "SoftUDC: A Software-Based Data Center for Utility Computing", Retrieved at <<http://ieeexplore.ieee.org/stamp/stamp.jsp?arnumber=01362586>>, Nov. 2004, pp. 38-46.
McKeown, N.,et al., "OpenFlow: Enabling Innovation in Campus Networks", Retrieved at <<http://www.openflowswitch.org/documents/openflow-wp-latest.pdf>>, Mar. 14, 2008, pp. 6.
Menon, A., et al., "Optimizing Network Virtualization in Xen", Retrieved at <<http://www.cs.uiowa.edu/~gjordans/Papers/xen-net-opt.pdf>>, Proceedings of the annual conference on USENIX '06 Annual Technical Conference, 2006, pp. 14.
"An Overview of Windows Azure", Retrieved at <<http://blogs.msdn.com/b/tims/archive/2009/03/24/overview-of-windows-azure.aspx>>, Mar. 24, 2009, pp. 1.
"Introduction to Receive-Side Scaling", Retrieved at <<http://msdn.microsoft.com/enus/library/ee239195.aspx>>, Retrieved Date: Jul. 12, 2010, pp. 1.
"Microsoft Hyper-V Server", Retrieved at <<http://www.microsoft.com/hyper-vserver/en/us/default.aspx>>, Retrieved Date: Jul. 12, 2010, pp. 2.
Minkenberg, C., et al., "Adaptive Routing in Data Center Bridges", Retrieved at <<http://capinfo.e.ac.upc.edu/PDFs/dir10/file003461.pdf>>, 17th IEEE Symposium on High Performance Interconnects, Aug. 25-27, 2009, pp. 33-41.
Pan, R., et al., "QCN: Quantized Congestion Notification", Retrieved at <<http://www.ieee802.org/1/files/public/docs2007/au-prabhakar-qcn-description.pdf>>, May 29, 2007, pp. 26.
Pfaff, B., et al., "Extending Networking into the Virtualization Layer", Retrieved at <<http://conferences.sigcomm.org/hotnets/2009/papers/hotnets2009-final143.pdf>>, Proceedings of the 8th ACM Workshop on Hot Topics in Networks, Oct. 2009, pp. 6.
Santos, J.R., et al., "Bridging the Gap between Software and Hardware Techniques for I/O Virtualization", Retrieved at <<http://www.hpl.hp.com/techreports/2008/HPL-2008-39.pdf>>, USENIX 2008 Annual Technical Conference on Annual Technical Conference, 2008, pp. 16.
Tripathi, S., et al., "Crossbow: From Hardware Virtualized NICs to Virtualized Networks", Retrieved at <<http://hub.opensolaris.org/bin/download/Project+crossbow/Docs/crossbow-sigcomm-visa09.pdf>>, VISA, Aug. 17, 2009,pp. 9.
Williams, Mitch., "Evolving New Configuration Tools for IOV Network Devices", Retrieved at <<http://www.xen.org/files/xensummit_amd10/IOVnetwork.pdf>>, Apr. 2010, pp. 5.
Bestler, Caitlin., "End Station Issues", Retrieved at <<www.ieee802.org/1/files/.../au-bestler-endstationrps-0708-04.pdf>>, Jul. 2008, pp. 24.
"Amazon: Hey Spammers, Get Off My Cloud", Retrieved at <<http://voices.washingtonpost.com/securityfix/2008/07/amazon_hey_spammers_get_off_my.html>>, Retrieved Date: Sep. 7, 2012, pp. 5.

* cited by examiner

200

1: Begin(weight $W$)
2: { rate $r \leftarrow I$, weight $w \leftarrow W$ } ▷ Initialize
3: TakeFeedback(feedback $f$, proportion $p$)
4: {
5: if feedback $f$ indicates loss then
6: $\quad r \leftarrow r - r * \alpha * p$ ▷ Multiplicative Decrease
7: else
8: $\quad r \leftarrow r + w * p$ ▷ Weighted Increase
9: end if
10: }

1: .Begin (weight $W$)
2: { $rc_l$.Begin($W$) ∀ links $l$ used by sender } ▷ Initialize
3: .TakeFeedback (feedback $f_{dest}$)
4: { store feedback }
5: .Periodically ()
6: {
7: proportion of traffic to $d$, $p_d = \frac{f_d.bytesRcvd}{\sum f_i.bytesRcvd}$
8: for all destinations $d$ do
9:     for all links $l \in PathTo(d)$ do
10:         $rc_l$.TakeFeedback($f_d, p_d$)
11:     end for
12: end for
13:     ▷ $rc_l$ now contains per-link share for this entity
14: $n_l \leftarrow$ count of dest with paths through link $l$
15:     ▷ $r_d$ is allowed rate to $d$
16: $r_d \leftarrow \min_{l \in PathTo(d)} \left( \left( \beta p_d + \frac{1-\beta}{n_l} \right) rc_l.rate \right)$
17: }

1: .Begin(weight $W$)
2:   { rate $r \leftarrow I$, weight $w \leftarrow W$, $c \leftarrow 0$, $inc \leftarrow 0$ }    ▷ Initialize
3: .TakeFeedback(feedback $f$, proportion $p$)
4: {
5:   $c \leftarrow c + \gamma * p * (f.bytesMarked - c)$
6:             ▷ maintain smoothed estimate of congestion
7: if $f.bytesMarked > 0$ then
8:     $r_{new} \leftarrow r - r * \alpha * p * c$  ▷ Smoothed mult. decrease
9:     $inc \leftarrow 0$
10:    $t_{lastdrop} \leftarrow now$
11:    $r_{goal} \leftarrow (r > r_{goal})?r : \frac{r+r_{new}}{2}$
12: else                                            ▷ Increase rate
13:     if $r < r_{goal}$ then   ▷ Less than goal, concave increase
14:        $\Delta t = \min\left(\frac{now - t_{lastdrop}}{T_s}, .9\right)$
15:        $\Delta r = \delta * (r_{goal} - r) * (1 - \Delta t)^3$
16:        $r \leftarrow r + w * \Delta r$
17:     else                 ▷ Above goal, convex increase
18:        $r \leftarrow r + p * inc$
19:        $inc \leftarrow inc + w * p$
20:     end if
21: end if
22: }

FIG. 7

PERFORMANCE ISOLATION FOR CLOUDS

BACKGROUND

Recently there has been an increase in the use of data centers as a venue for vendors to provide computing resources to customers. Also referred to as clouds, compute clusters, grids, and other terms, these types of data centers typically include large numbers of server computers (nodes) hosting data and applications (typically, network services or virtual machines) for the customers. Often a server may simultaneously host applications of different customers. While technologies such as virtualization exist to manage sharing of computation resources in a cloud, there are shortcomings with previous technologies that manage the use of the underlying data network. In particular, there has been a lack of effective regulation of network use that can prevent a tenant from obtaining disproportionate use of the network and yet provide reasonable network performance. In the presence of greedy or malicious tenants, other tenants may be subject to unpredictable performance and denial-of-service attacks. Even when clients are well-behaved, natural variations in their workload cause the network to be divided arbitrarily and not as per what the cluster provider may intend.

Some approaches have relied on TCP's (transmission control protocol) congestion control. However, a customer application can achieve unbounded utilization of the network by using many TCP flows, variations of TCP, protocols such as UDP (user datagram protocol) that do not respond to congestion control, or by bypassing congestion control in guest VMs (virtual machines). Another approach imposes static traffic limits on traffic sent to and from each VM. In spite of this a malicious user can render a target service or VM or rack of servers unreachable by placing a trojan receiver on the target and using a few other VMs to transmit full rate UDP flows to the trojan VM, thereby overflowing the host server's bandwidth, the downlinks of the server's rack, etc. In either case, the victim VMs that happen to be co-located on the server or rack may become compromised.

Generally, there has not been any way by which network use in a cloud can be allocated and regulated above the network level (e.g. at the granularity of traffic sourcing entities such as tenants, applications, services, etc.) and in a way that reliably prevents disproportionate bandwidth consumption. Scalable techniques for network performance isolation that are robust in the presence of churn without impacting performance are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Network traffic control is performed at the nodes participating in a cloud or data center. Specifically, a weight is associated with each traffic sourcing entity, which may be a VM, a hypervisor, a port, an application, or collections or combinations thereof such as all traffic belonging to a tenant. Along network links, the share of bandwidth obtained by a traffic source is proportional to its weight. At any link in the network, a current transmission rate of the link is allocated among the traffic sources using that link. Links include the network interfaces of the nodes and the interconnections between switches or routers in the middle of the network. Thus each traffic sources receives at least a predefined share of the transmission capacity of each link. Unused shares are allocated proportionally to entities that are backlogged. The share of bandwidth capacity on a link can vary depending on which other sources are using that link. For example, if congestion occurs, the per-entity shares may decrease.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 5 shows a computer on which one or more embodiments described above may be implemented.

FIG. 6 shows the logic in procedure 210.

FIG. 7 shows the logic in procedure 220.

DETAILED DESCRIPTION

Embodiments discussed below relate to regulating how a network is shared where performance may be isolated at the granularity of the cloud entities (customers, tenants, users, etc.) that are using the cloud. The embodiments may be scalable, robust when churn is high, and, allow for high network utilization. An example cloud will be described first, followed by an example general embodiment. A VM-based embodiment will also be described. Controlling rate of usage based on various forms of network feedback will be explained, as well as several variations and implementation details.

Figure 1:
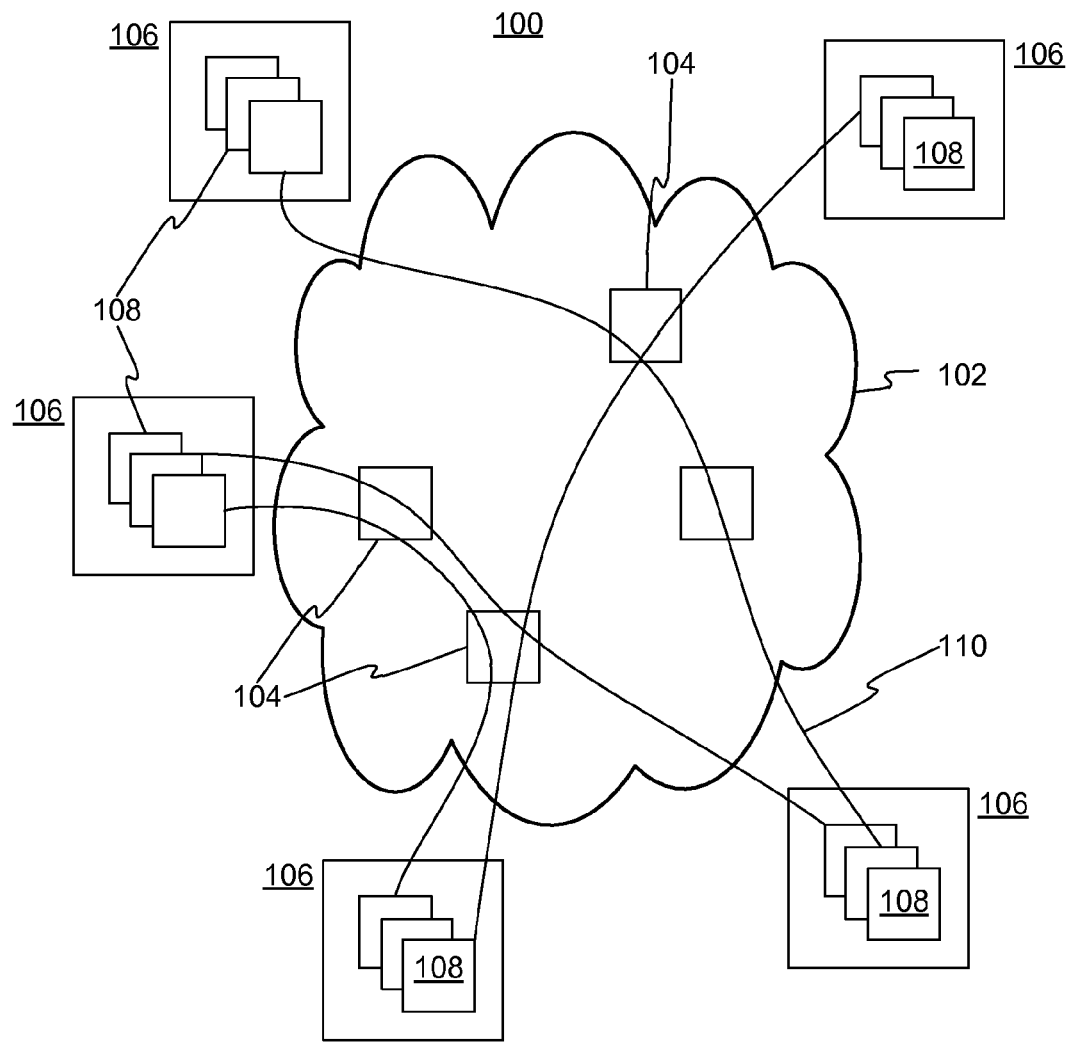
FIG. 1 shows an example cloud.

FIG. 1 shows an example cloud 100. The cloud 100 may have a network 102, which may include various network devices 104 such as routers, bridges, gateways, links, and other devices that cooperate to provide network connectivity. Servers 106 use the network 102 to communicate with each other and with hosts outside the cloud 100. A server 106 may be a blade computer, a computer in a rack, a workstation, a laptop, or any other computer generally having a processor, memory, and an interface for communicating with the network 102.

Each server 106 may have execution units 108 executing thereon. An execution unit 108 may be a process, a virtual machine, an application or service, etc. As execution units 108 execute, they communicate with each other across the network 102. The term "flow" or "path" is sometimes used to refer to a connection between two specific execution units 108, or specifically, a traffic stream from a sending execution unit 108 to a receiving execution unit 108, sometimes identified by a five-tuple: (source address, destination address, source port number, destination port number, protocol). Example flows 110 are show in FIG. 1. For example, a database server execution unit 108 on one server 106 may have a flow 110 of communication with a network service execution unit 108 on another server 106. As mentioned in the Background, it has previously been possible for the execution units 108 of one entity to interfere with the execution units 108 of other entities. For example, by instantiating many flows 110, running excessive execution units, and so on.

Although not shown, cloud 100 may in some cases include software infrastructure to manage the cloud 100, which, may perform functions such as load balancing, migration of virtual machines, abstraction of services such as data storage, access control, allocating resources such as processor time, power management, and so on. Generally, by consolidating applications onto a common infrastructure, cloud datacenters achieve efficient use of a resource pool and can be readily scaled up and or down with changes in demand. Commodity virtualization stacks (e.g., Xen, HyperV) let existing applications run on the cloud with few modifications.

Whether commodity or custom components are used for the cloud infrastructure, it should be appreciated that because clouds often run arbitrary tenant code (code neither scrutinized nor specifically approved by cloud operators), they are at risk from malicious or runaway nodes or servers. For instance, Amazon Web Services (AWS) has been used by spammers and has been subject to denial of service (Dos) attacks. The incentive to interfere with cloud-hosted applications has risen as high-value applications have moved to cloud platforms.

Furthermore, commonly available techniques for network-level separation in Ethernet-based networks, VLANs (virtual local area networks) and CoS (Class of Service) tags, cannot scale to cloud datacenters. Due to typically large numbers of servers, cores/servers, VLANs (virtual local area networks) and tenants, simply mapping tenants to a small number of isolation primitives leads to fate sharing between tenants on the same VLAN, queue, network class, rack, VLAN, etc. High rates of churn exacerbate the problem; usage enforcement by modifying VLANs on all switches and hosts in the network upon each tenant change is impractical. Per-tenant bandwidth reservations result in under utilization of the network.

By providing network performance isolation between tenants it may be possible to both minimize disruption from legitimate tenants that run network-intensive workloads and at the same time protect against malicious tenants that launch DoS attacks. Without such isolation, a tenant that sends a high volume of traffic to shared services can deny service to tenants that happen to be co-located at either end or that share intermediate network links. In one embodiment described later, isolation is either enforced only when congestion is detected or is regulated according to by information indicating congestion.

The general isolation approach described next is based on adaptive throttles (or, rate controllers) that are implemented in the host (e.g., server 106). Implementation is generally outside tenant execution units (e.g., guest VMs) and does not require use of per-flow state from switches, although it will be explained how switch measurements can be used when available. The approach may be largely independent of the implementation of the physical data center or cloud network. A cloud administrator may assign weights of network usage to tenants or other traffic sources above the network level. A service interface may allow tenants to divide their use by weighting execution units. Specified divisions of usage can be maintained even as execution units and tenants come and go in the cloud.

Figure 2:
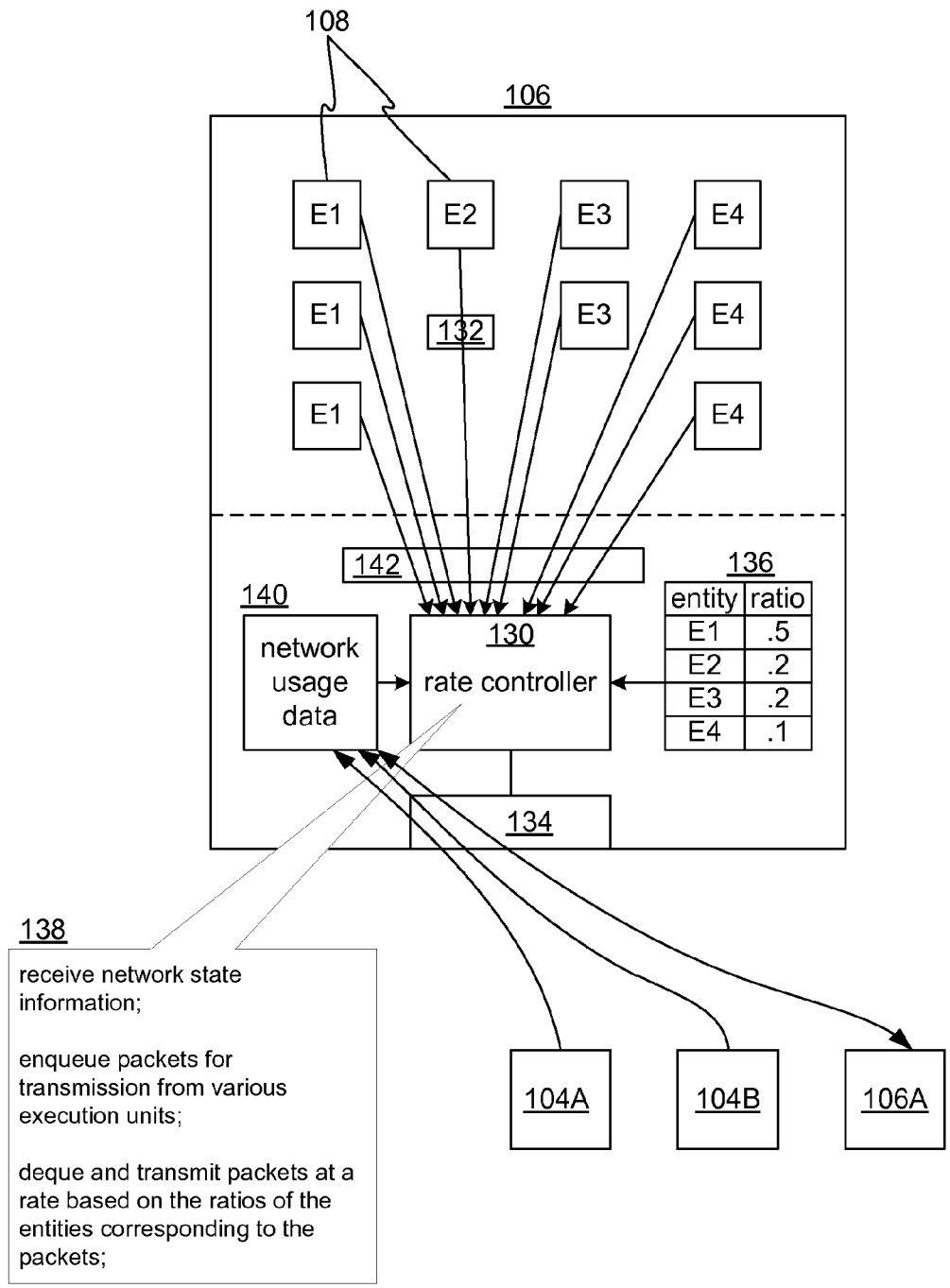
FIG. 2 shows a rate controller for network isolation of cloud tenants.

FIG. 2 shows a rate controller 130 for network isolation of cloud tenants. The rate controller 130 is a thread or process executing on the server 106, for example, in a hypervisor, kernel, or other part of the server 106 that is usually controller by the operator of the cloud. The server 106 is executing execution units 108, labeled according to the entities that they are associated with. Packets 132 emanating from the execution units 108 to be transmitted via the network 102 to other servers 106 are temporarily stored (e.g., in queues, a cache, etc.) and then released by the rate controller 130 to be transmitted by a network interface 134 of the server 106. As will be explained, the rate controller 130 is able to isolate and regulate without requiring any specific data center topology or hardware support.

A set of ratios or weights 136 are accessible to the rate controller 130 (e.g., locally stored as configured by an administrator, read from a central controller, etc.). Generally, only the weights of entities on a given server 106 are needed on that server. Furthermore, a weight can be modified at any time, including while its corresponding execution unit is running. While various terms such as "weight", "ratio", and others will be used to refer to the weights 136, it should be understood that any information assignable to an entity indicating a relative or proportional share of network traffic or capacity (or a share of network congestion to be avoided or absorbed) of the entity can be used. In any place where "ratio" is used, "weight" is equally applicable.

The rate controller 130 controls the rate of transmission of the local execution units 108. As all or most application-hosting servers 106 may be running a rate controller 130 in similar fashion as will be described, the cloud-wide net effect is that traffic passing through the network 102 is rate-controlled as a whole according to entity-specific ratios.

Regarding the operation of the rate controller 130, in general, the rate controller throttles the rate of transmission of outgoing packets of execution units of entities on the server 106. Moreover, the throttling or rate controlling is performed at the entity/tenant level and in proportional fashion; net usage (e.g., transmission) for any given entity is regulated relative to the transmission of other entities. As will be seen, network usage can be sensed or measured in a variety of ways. For example, network usage may be in the form of available bandwidth, degree of congestion or saturation, bandwidth or capacity of involved links (e.g., network devices 104), and so on.

In one embodiment, the rate controller 130 isolates and regulates traffic using what in effect may be called congestion controlled tunnels. The rate controller 130 at a sending server 106 determines how much traffic can enter the network 102 based on feedback from the receiver (e.g., server 106A) and/or network devices 104 (e.g., switch 104A and router 1046) along the path. In platform clouds or data centers (see, e.g., Cosmos by Microsoft Corp.), this information can be conveyed by implementing a shim layer that interjects packets on the path to and from the network interface 134 (see shim 176 in FIG. 4).

In virtualized clouds or data centers (e.g., EC2, Azure™ from Microsoft Corp.), a rate controller 130 can be implemented in the host partition, root VM, dom0, or hypervisor, as may be the case. While this may be feasible within the cloud itself to manage intra-cloud traffic, to take into account traffic entering and leaving the cloud, it can be assumed that the cloud's Internet gateway participates like any other server 106, cluster node, etc.

In one embodiment, the rate controller 130 implements a process 138 in which network state information or usage data 140 (e.g., congestion feedback) is received, stored, and regularly updated. Outgoing packets from local execution units 106 are stored in a temporary storage 142. For example, a priority queue may be used, or a simple table indexed on entity (so that packets for a given entity can be counted, selected, etc.), or a queue for each entity may be used. As the rate controller 130 increases or decreases transmission rate, the packets in temporary storage 142 are dequeued and transmitted according to rates determined by the rate controller 130 based on the weights 136 and the network usage data 140. The network usage data 140 may be any information about the recent state of the network. Other embodiments may use approaches other than storing-and-forwarding packets to control the bandwidth. For example, a host can drop packets to ensure that rates comply with the controller. In some cases, a transport or application protocol can perform error detection and/or re-transmission. In other embodiments, packets may be declined when requested to be transmitted by an application.

In one embodiment, the rate controller may use a weighted form of AIMD (additive increase multiplicative decrease). The server 106 receives and stores the network usage data 140, which may take various forms such as feedback about the congestion state of paths, e.g., whether packets were lost in a recent period, etc. The rate controller increases its rate proportional to the network weight if there is no congestion, and decreases it multiplicatively if there is congestion. The rate controller and supporting components may be deployed with varying levels of support from the network. Periodic reports of loss/no-loss feedback may be provided from the receiver server, ECN (explicit congestion notification) marks indicating queue build-up from switches along the path, or more explicit feedback about the available bandwidth and number of contenders from the switches may be used.

Details on how loss/no-loss feedback can be incorporated into a rate-controlling algorithm are discussed further below. In general, though, an increase mechanism may be used that adapts the rate of increase following periods of no-loss and a decrease mechanism that slows the increase when nearing congestion. These may be similar to TCP-BIC and TCP-Africa, with some adaptation. Adaption may help to avoid over-long times to convergence and oscillation of rates when convergence (equilibrium) is reached. When ECN marks or other switch feedback is available (as stored in network usage data 140), the rate adaptation rules are subtly different leading to faster and more stable convergence (see FIG. 7).

To achieve entity-level isolation (isolation on a per-tenant basis), it might not suffice to control traffic for individual source-destination pairs. That is, to allocate the network in proportion to the weight assigned to any entity independent of how many destinations are being communicated with, a rate controller may combine the feedback from all of the destinations (or network devices 104 along the relevant network paths) used by that entity. This allocation technique may prevent cross-entity performance interference and is consistent with how cloud providers allocate other cloud resources such as computation and storage resources.

Regarding setting values for weights 136, different settings for weights (relative proportions) are appropriate based on the application and the cloud or data center. For example, a cloud administrator can assign equal weights to all VMs thereby avoiding performance interference, or can assign weights in proportion to the size or price of the VM. To provide SLAs (service level agreements), e.g., to guarantee some minimum bandwidth, an administrator can choose where to place a new VM and what weight to provide to it such that the SLA would be satisfied. In map-reduce data centers, setting the same weight for all tasks may ensure that reduce tasks do not stomp on maps. Increasing the weight of tasks that have been starved or are at a crucial juncture (and perhaps holding back other tasks in that job from starting) will improve job completion times.

Figure 3:
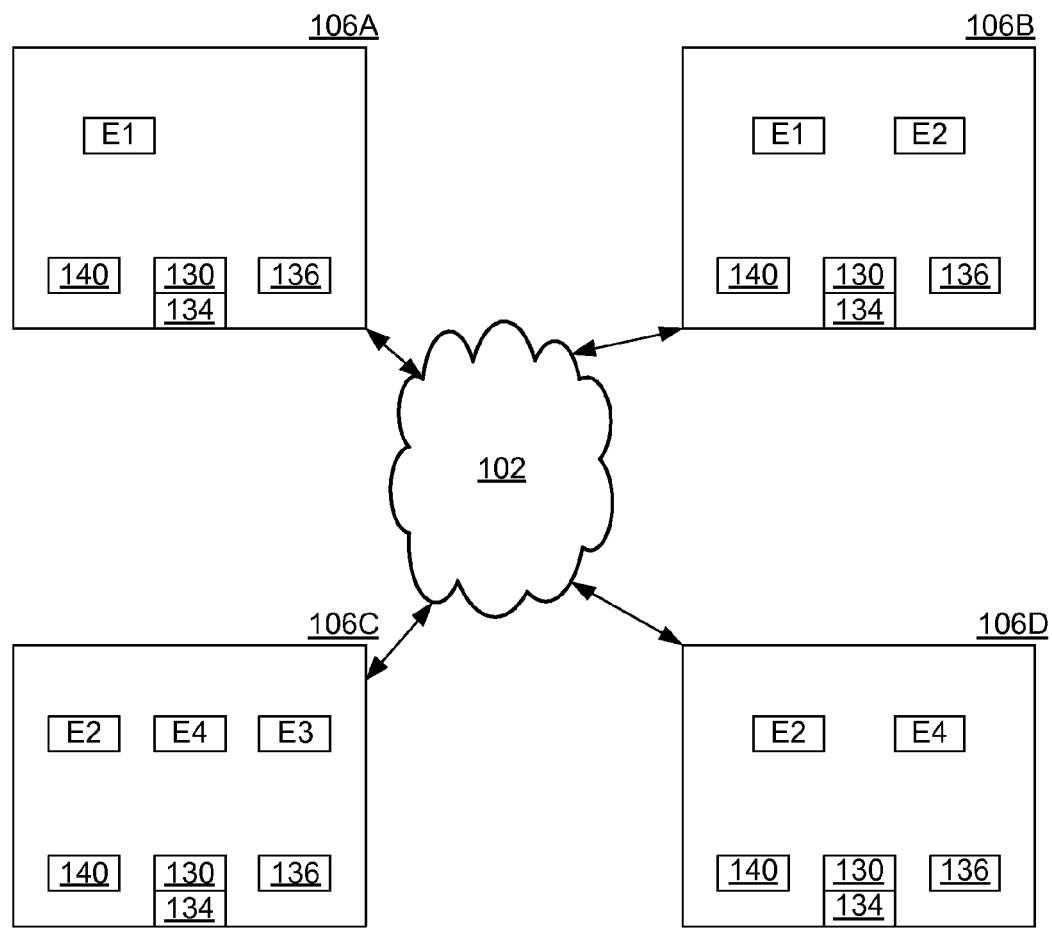
FIG. 3 shows an example of servers configured according to FIG. 2.

FIG. 3 shows an example of servers 106 configured according to FIG. 2. On server 106A, only entity E1 has execution units (any of boxes E1 through E4 represent the total execution units for the corresponding entity on a server). If entity E1 has an allocation weight or ratio of 0.5, then the rate control algorithm will assure that half of whatever bandwidth (or transmission rate, or link) that is available goes to the execution unit(s) of E1. Because the algorithm may divide unused capacity among the entities on a server, E1 will also obtain the other 0.5 of server 106A's capacity. On server 106B, if entity E1 has a ratio of 0.5, and E2 has a ratio of 0.2, each will be given at least such portions of allocatable bandwidth, and the remaining 0.3 will be divided among E1 and E2. On server 106C, each entity will get its corresponding portion of available transmission rate. Moreover, if an entity is not using all of its allocation, the remainder is shared among the other entities if they need it.

Figure 4:
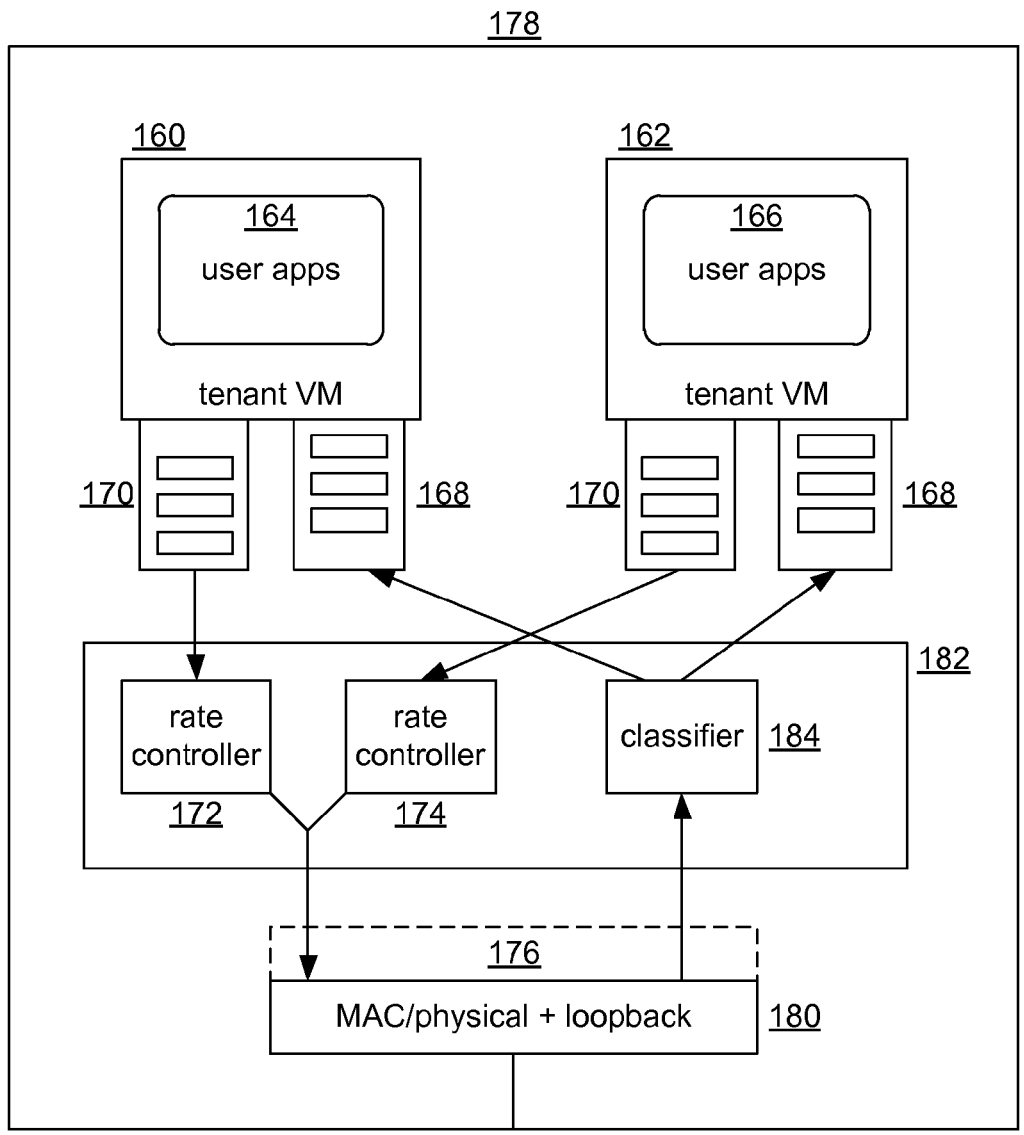
FIG. 4 shows a hypervisor-based embodiment.
Figure 8:
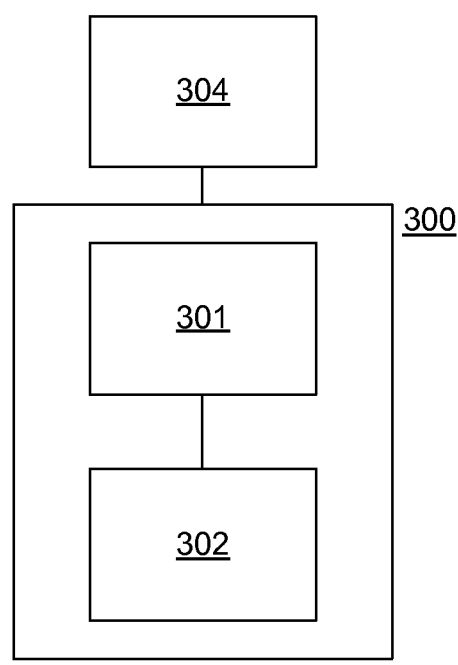
FIG. 8 shows a computer (300) on which one or more embodiments may be implemented.

FIG. 4 shows a hypervisor-based embodiment. In one embodiment, cloud 100 may be implemented with virtual machines. An operator of a cloud or data center may sell or allocate computation resources in units of VMs. A tenant may buy one or more VMs which run the tenant's application code on a server in isolation from any other tenant VMs. In FIG. 4, a first tenant entity has a VM 160 and a second tenant entity has a VM 162. Tenant VM 160 may have first applications 164, processes, etc., running for the first tenant. Similarly, tenant VM 162 has software, second applications 166, etc., running for the second tenant. Each VM 160, 162 may have incoming packets 168 and outgoing packets 170. A rate controller 172, 174 may be instantiated for each VM 160, 162. All of the outgoing packets 168 of a VM 160, 162 are regulated by a corresponding rate controller 172, 174. That is, a rate controller 172, 174 controls the rate, timing (amount of delay, if any), etc. of transmission of outgoing packets 168. As mentioned earlier, a shim 176 may be provided for detecting network conditions such as traffic on links, congestion data, etc. The server 178 may have one or more physical network interface cards (NIC) 180.

In one embodiment, the rate controller resides in and operates as part of a hypervisor 182 on the server 178. Each rate controller, for example rate controller 172, may be driven by feedback from the network and from the hypervisor 182, which regulates all traffic sent from a tenant. Thus, the rate controller can control even tenants that send UDP traffic or use misbehaving TCP stacks; malicious tenants cannot attack the rate controller directly by spoofing feedback packets and cannot escape the rate controller without breaking hypervisor isolation. The rate controller also protects against direct denial of service attacks because a recipient of unwanted traffic can ask the sender's rate controller to block future traffic to the recipient.

The rate controller may make use of Layer 3 (IP) signaling feedback, which can traverse arbitrary datacenter topologies. While rate controllers of servers or nodes of the cloud may regulate primarily intra-cloud traffic, external traffic can be handled by allowing the cloud or datacenter's Internet gateway to participate like any other server.

In another embodiment, rate controllers are implemented in a virtual NIC, which is the hypervisor component that exports a network device interface to a guest VM's network driver. A rate controller takes as input the packets received and sent by the server 178 and congestion feedback from the network and recipient(s). On the receive path, the virtual NIC checks for congestion signals, such as ECN marks or lost packets, and sends this feedback to the sender (whose rate controller then uses the congestion signals). On the send path, the virtual NIC, via classifier 184, classifies incoming packets into per-(sourceVM, destinationVM, path) queues, with external destinations mapped onto the Internet gateway. The "path" parameter is for networks that use multipath (e.g., ECMP) to assign packets with the same TCP/UDP 5-tuple to different paths. Rather than aliasing feedback information from different paths onto a common rate controller, 5-tuples are mapped to queues via a flow-traceroute. Because ECMP deterministically maps a 5-tuple to a path, flow-traceroute uses the same source, destination, protocol, and port numbers, in traceroute probes. In practice, this mapping rarely changes and can therefore be cached.

Regarding the control algorithm that a rate controller uses, any existing or modified rate control algorithm can be used, such as TCP, TFRC (TCP-friendly rate control), or QCN (quantized congestion notification), to determine the rate of service for the transmit queues. Such algorithms vary in their stability, reaction time, and tolerance to bandwidth delay. The appropriate algorithm for any implementation will depend on particulars of the cloud, servers, and other relevant components.

Note that TCP-like rate control may provide max-min fairness between each contender. In typical use, each contender is a flow, but as described above, each contender is a communicating pair of entities (e.g., VMs). It can be deduced that a tenant with N VMs can grab up to an $N^2$ proportion of bandwidth by communicating between all pairs. To mitigate this, a rate controller can use path feedback to estimate TCP-like fair rate for each (senderVM, link). In other words, a VM's share on each link along the path is independent of the destination. The rate of service for each transmit queue is the minimum of the rates of links along the corresponding path.

As mentioned previously, because a rate controller changes the order in which packets drain from the virtual NIC, head-of-line blocking can occur in the guest VM's NIC driver. The virtual NIC driver block-waits for the virtual NIC to acknowledge that packets have been sent to prevent overflowing the NIC buffer before sending more packets. To address this problem, a rate controller can send positive or negative feedback (e.g., with window size or ECN) to an unmodified guest VM running TCP, expose destination-specific queues to the guest VM, or apply backpressure on a per-socket, rather than a per-NIC, basis. Such modifications to the virtual NIC interface are becoming more common with vendors.

To implement a rate controller in the publicly available HyperV hypervisor, no HyperV-specific functionality need be relied on. A timer of sufficient resolution will help with in-place modifications of packets from the guest VM.

To ease development, deployment, and distribution, the rate controller can be implemented as an NDIS (network driver interface specification) packet filter driver rather than as changes to the virtual NIC. Should there be a need to send control messages between the guest VM and the filter driver, such messages can be tunneled over Ethernet, for example.

The rate controller may be installed directly above the physical NIC driver, where it interposes on all sent and received packets. The rate controller may implement a TCP-like algorithm and apply an encapsulation header around the transport headers, consisting of packet sequence number, packet acknowledgment number, and a single entry SACK.

To aid performance, it may be helpful to have an alternate, offload-compatible way to encode data from the rate controller. An encoding can break offloading if the hardware cannot parse the resulting packet header. Conversely, offload hardware can break an encoding if it overwrites or discards data. Consequently, the rate controller (or shim 176) can "steal bits" from unused, redundant, or predictable bits in the TCP/IP headers. For instance, a rate controller can encode data in any field, such as the IP ID and TCP timestamp so long as it (1) accounts for how the network and NIC interpret and update those fields, and (2) upon receiving a packet, it restores these fields to reasonable values for the guest VM. To minimize the required space, the rate controller can encode merely a sequence number, which suffices for detecting losses. Other information, such as acknowledgments and RTT estimates, is exchanged on a separate connection between the source and destination hypervisors.

An embodiment may be implemented that takes advantage of virtualization-aware NICs, if available. Some NICs for virtualized data centers include additional hardware offloads that allow guest VMs to directly access the hardware, bypassing the CPU and avoiding latency overheads of passing packets through the hypervisor. Using the PCI (peripheral component interconnect) SR-IOV (single-root I/O virtualization) interface, the hypervisor can bind VMs to dedicated virtual contexts that each provide the abstraction of a dedicated NIC. To prevent starvation and to provide proportional resource allocation, hypervisors can configure NICs to enforce rate limits for each virtual context. A rate controller can be rendered compatible with virtual contexts by given appropriate NIC or network support.

A rate controller can be divided into two functional components. A rate selector outside the forwarding path (in HyperV, running in a user-space process within the root partition) continuously updates the rate limits for each flow based on congestion signals. A rate limiter on the forwarding path (in HyperV, running in the filter driver) enforces these limits. For guests that directly use a virtual context, the rate selector would instead configure the corresponding NIC rate limiter. Alternatively, the rate selector can configure a matching monitor in an upstream switch.

As mentioned above, a receiver server can provide loss/no-loss feedback to a sender server, for example, every 50 ms. Round trip times (RTTs) within the datacenter are relatively small and any feedback period larger than the maximum RTT will suffice. A fixed period will avoid the RTT-based unfairness that Internet congestion control algorithms sometimes cause. Lost feedback is treated as an indication of congestion.

The sender and receiver may agree on which set of packets is covered in the feedback. A sender may maintain a byte sequence number for each destination, which it maps in all the packets sent to the receiver. By comparing the total bytes received with the gap between the sequence numbers for the first and last packet in a feedback period, the receiver can infer whether loss occurred and how many packets were lost.

When the receiver reports no-loss, the sender increases the allowed rate on the path (additive increase). To converge faster, the value that the rate will increase by increases with each no-loss period. When the feedback indicates loss, the sender multiplicatively decreases its allowed rate.

If the logic described above is applied in a way that allocates the network for each source-destination pair, unbounded allocations could occur when the number or destinations varies. Rather, a rate controller can retain the structure of one allowed rate value per execution unit, but compute the allowed rate by accounting for feedback from all paths that are used by an entity.

In yet another embodiment, a rate controller can be maintained for each link on the paths used by an entity. The feedback from a destination is processed by the controllers on all links along the path to that destination. Feedback from multiple destinations that cross a link are combined in weighted proportion of the amount of traffic that has been exchanged with each destination. The rate controller on each link thus converges to the allowed rate for all traffic passing through the link. The allowed rate per link is divided among the multiple destinations using the path. Furthermore, the allowed rate on a path is computed as the minimum of that path's share of the allowed rate on each link along the path.

Additional and alternative embodiments are now described.

Using Feedback from Many Destinations

As noted above, feedback from multiple destinations can be combined so that the net share of a sender is independent of however many destinations the sender communicates with. Consider the procedure 200 shown in FIG. 5. Ignoring the proportion variable until later, when given a feedback packet, the basic changer reduces the rate by a multiplicative factor and otherwise increases it by an additive amount ω corresponding to the weight associated with the class. By default, α=0.2 is used. Justification of parameter choices to is discussed further below. Conservatively, no feedback is considered within a period of T as if a feedback indicating loss had arrived. When most or all users of a resource employ this basic rate changer procedure 200, their rate variables average to a weighted share of that resource.

To combine feedback from multiple destinations, a basic rate changer object can be maintained per link on each network path that the sender has sent data over in the recent past. The rate changer stores the feedback from each destination, and once every period T, applies all the feedback cumulatively. FIG. 6 shows a procedure 210 that describes this logic. Notably, the feedback from each destination is applied in proportion to the corresponding sender's traffic that is sent to that destination (line 7, 10).

Consider an approach where one basic rate changer is used per destination. Cumulatively, a node with three connections or flows on a link would be able to increase its rate by thrice as much as a node with one flow on the link in a period when the link has idle capacity. However, with a rate changer as in procedure 210, there is one object corresponding to the bottleneck link, and the cumulative effect of feedback from the three destinations will increase that node's share by only as that of the single flow node.

Note that if all the feedbacks are identical, i.e., they all report loss or no loss, then combining the feedbacks is the same as if there were just one destination. However when the feedbacks differ, the feedback from destinations that received more bytes may be considered as more indicative of the state along that link. Not all links will lie on the paths to all destinations. Note that for links that are only shared by a subset of destinations (with the corner case of just one destination); only feedback from that subset of destinations is used to compute the allowed rate on that link.

A final aspect is to convert the per-link allowed rates computed above to the allowed rate per destination at which throttling occurs. One technique is to divide the link's allowed rate evenly across destinations reached through that link. Link bandwidth is apportioned to destinations as shown in line 14 of procedure 210. The intuition is to make the allocation proportional to the current usage proportion. However, allocating based only on current usage will persist with an unequal share even when demands for other destinations change. Hence, a fraction β of the link bandwidth proportional to current usage is assigned, and the remainder is assigned evenly across destinations. By default β=0.9. Finally, the allowed rate to a destination is computed as the minimum of that destination's share of the allowed rate on each link on the path to the destination.

Additional Rate Adaptation Logic

The basic rate change logic in procedure 200 can be modified for faster convergence and, upon convergence, lower variation in rates and smaller queues at bottleneck links. The logic shown in procedure 220 in FIG. 7 can be used in place of procedure 200. The algorithm to combine feedback from multiple destinations described above functions without change, due to the clean decoupling between procedure 210 and procedure 200. Several adapted insights are now mentioned.

The first insight is to increase the amount that the rate increases following each period of no-loss (lines 18,19 in procedure 220). If all rate changers follow the same mechanism, as they would the above-mentioned shim is used, the property that the average rate will be proportional to the weight continues to hold, which might speed up convergence. In effect, the time to reach a rate goal G from an initial value I with the same step size S reduces from $$\frac{G-I}{S}$$

to less than $$\sqrt{\frac{2(G-I)}{S}}$$

iterations.

However, the step size is the largest when the rate crosses the available bandwidth, causing losses. Hence, a second insight is to remember the largest rate achieved at loss, $r_{goal}$ (line 11) and engineer the advance such that the rate stays close to this goal for a large amount of time (lines 14-17). In particular, post a loss event and while the rate is smaller than $r_{goal}$, the rate is increased quickly at first and slower as rate approaches $r_{goal}$. To do so, the time at which the last loss happens 'lastdrop is remembered, a period $T_s=K*T$ is chosen, and a change is made to the rate along a concave (cubic function) that begins at r and reaches $r_{goal}$ K in no-loss periods. Set K=12 and choose δ=0.4. This means that the rate increases to 30%, 54% and 71% of the difference between r and $r_{goal}$ in the first three no-loss periods. As before, weighing the increase in proportion to ω (line 16) ensures that the average rates are proportional to the weights. These adaptation laws are similar to that of CUBIC, but have been adapted to incorporate weights and multiple destinations.

Our third insight is to use ECN marks to keep the queue sizes at the bottleneck from growing too large. Switches mark packets whenever the queue size grows larger than a threshold using the ECN bit. The shim at the receiver relays the fraction of marked packets to the sender, which maintains a moving average of the probability of marking and uses it to smooth the extent of decrease (lines 5, 8). Our parameter choices for the threshold on the queue size and the moving average are similar to that of DCTCP. However, lines 5 and 8 are suitably adapted to work when combining marks from multiple destinations.

Nesting Traffic

Nesting traffic of different types within the adaptive throttle described above leads to some subtle interactions. If a sender always sends less traffic than the rate allowed, the sender may never see any loss, causing the sender's allowed rate to increase to infinity. This happens when the traffic consists of TCP flows that are low rate (e.g., web traffic) or are limited by flow control (i.e., send or receive windows aren't large enough). Such a sender can launch an arbitrarily large burst of traffic. Hence, the rate allowed to a sender is limited to 1.5 times the largest rate the sender has used in the recent past.

Furthermore, the network stack can be modified to defer congestion control to the shim at the sender. In non virtualized settings, where both TCP and the shim are implemented in the same context, signaling between the two parts for the purposes of congestion control is convenient. When a flow has packets to send, rather than relying on its CWND (congestion window), it queries the corresponding rate limiter in the shim as to whether a send is allowed. Flows that have a backlog of packets to send register back-pointers with the shim to be notified when they can next send a packet. However, this approach does not extend to virtualized settings, since signaling over a VM-bus has high lag. To reduce the amount of signaling required, the following approach is used. The shim configures each VM with a max CWND—$C_{max}$—to use for all its flows, i.e., irrespective of what their CWND values are, every flow can hand off as many as $C_{max}$ bytes to the shim. The value $C_{max}$ is adapted intermittently, based on the size of the queue corresponding to the VM. The goal is to keep $C_{max}$ as large as possible while avoiding overflow in the queue at the shim, which would cause unnecessary loss.

The embodiments discussed above have focused on intra-data center traffic, because traffic entering and leaving a data center is subject to more stringent DoS (denial of service) scrubbing and is metered and billed, often at a higher price point. Traffic to and from the data center's Internet gateway can be controlled by deploying a shim on the gateway.

Weights and Parameters

Regarding the network weights, the choice of weights depends on the application and the data center. While many approaches can be used, the following may be considered. An administrator of a cloud data center can assign equal weights to all VMs, thereby avoiding performance interference, or can assign weights in proportion to the sizes or prices of the respective VMs. To provide an SLA (service level agreement) on minimum bandwidth, an administrator can choose where to place a new VM and what weight to provide to it such that the SLA would be satisfied. In map-reduce data centers, setting the same weight for all tasks will ensure that reduce tasks do not stomp on maps. Increasing the weight of tasks that have been starved or are at a crucial juncture and are holding back other tasks in that job from beginning will improve job completion times.

Regarding choices of parameters, consider the following. Reducing the feedback period T may make the adaptation logic more responsive at the expense of overhead. Reasonable balance may be obtained if the period $T \in [10, 50]$ ms. The multiplicative factor $\alpha$ controls the decrease rate (see procedure 200). With the basic rate changer, the smaller the $\alpha$, the greater the width of the rates average to desired values over longer periods of time. However, with the rate logic of procedure 220, there is less sensitivity to $\alpha$. In procedure 210, $\beta$, controls how much link rate is apportioned evenly versus based on current usage. The smaller the $\beta$, the faster a change in demand translates to a change in the rate fraction (at the expense of taking longer to apportion unused rate to needing destinations). Setting $\beta > 0.5$ may be practical.

CONCLUSION

FIG. 5 shows a computer 300 on which one or more embodiments described above may be implemented. A processor 301 is coupled with memory/storage 302 and a display 304. Moreover, embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of controlling network usage in a data center in which a plurality of server computers communicate via a network and host execution units that execute applications for a plurality of tenants of the data center, the data center comprising a network comprising network links providing interconnectivity between the server computers, wherein the tenants have respective pluralities of execution units executing on respective pluralities of the servers such that any given server is executing execution units of one or more tenants, the method performed at the servers, the method on a given server comprising:

executing a plurality of the execution units on the given server, including a first execution unit of a first tenant and a second execution unit of a second tenant, wherein each of the execution units generates and attempts to transmit a respective plurality of packets;

accessing allocation information comprising information indicating weights of the tenants, respectively, including a first weight of the first tenant and a second weight of the second tenant, each weight corresponding to a proportion of overall usage of the network that a corresponding tenant has been allocated;

receiving network usage data indicating traffic carried on the network for the first and second tenants, and based on the network usage data, identifying which network links were on network paths that, within a preceding time period, carried traffic from the first and second tenants to destination nodes on the network, wherein a rate controller is instantiated on the given server for each of the identified network paths; and performing rate control on the given host, the rate control controlling transmission rates of packets for the first and second tenants, respectively, wherein a first transmission rate of the execution unit of the first tenant depends on the network usage data and on the weight of the first tenant and a second transmission rate of the execution unit of the second tenant depends on the network usage data and on the weight of the second tenant, wherein the rate control is performed such that when the rate control determines that the first and second transmission rates are to increase or decrease they do so proportionally according to the respective weights of the first and second tenants, wherein the rate controlling is performed by the instantiated rate controllers cumulatively applying feedback from the destination nodes, and wherein the rate control determines when to release a packet for transmission based on both the weight of the corresponding tenant and a total network usage of packets being transmitted by all execution units of the corresponding tenant in the data center.

2. A method according to claim 1, wherein the network usage data indicates congestion along the network.

3. A method according to claim 2, wherein the network usage data comprises feedback from the other server, and the other server has an execution unit thereon that is communicating with an execution unit on the given server.

4. One or more computer-readable storage devices storing information that enables a computer to perform a process, wherein the computer participates as a server in a pool of servers that use a network to mutually form a cloud, the cloud hosting tenant applications of tenants of the cloud, the applications transmitting packets via the network, the process comprising:
    transmitting outgoing flows of packets from the computer to destinations on the network, where the outgoing packets are generated by traffic sources of tenants on the computer, a traffic source of a tenant comprising a virtual machine or a process or a port;
    based on flows of each respective tenant, identifying, for each tenant, the respective links in the network that are carrying the packets of the flows of the respective tenant, and receiving traffic indications of each of the respective identified links;
    accessing predefined weights assigned to the tenants, respectively;
    regulating, by the computer, the transmitting of the packets such that a total rate of transmission for the outgoing packets is varied according to information indicating a changing condition of the network; and
    wherein the regulating is also performed such that each tenant's packets are at a collective rate according to the corresponding tenant's predefined weight, wherein, when the total rate of transmission is to increase or decrease, each tenant's collective rate increases or decreases in relative proportion to its corresponding weight, and wherein the regulating is performed using an additive-increase multiplicative-decrease algorithm such that increases in the total rate of transmission are provided to the traffic sources in proportion to the weights corresponding thereto.

5. One or more computer-readable storage media according to claim 4, wherein the changing condition comprises congestion of a routing device that routed packets previously transmitted by the computer.

6. One or more computer-readable storage devices according to claim 4, wherein the regulating is performed by a rate controller executing on the computer above the network level.

7. One or more computer-readable storage devices according to claim 4, further comprising changing a rate of increase of the total rate of transmission following periods during which it is detected that there is no packet loss.

8. One or more computer-readable storage devices according to claim 4, further comprising changing a rate of increase when approaching a point where transmission by the computer causes congestion.

9. One or more computer-readable storage media according to claim 4, wherein a rate at which outgoing packets of a given tenant are transmitted by the computer is independent of how many traffic flows on the computer are associated with the given tenant.

10. One or more computer-readable storage devices according to claim 4, wherein the information comprises feedback from other servers in the pool that have received packets from the computer and/or feedback from routing devices that have routed packets from the computer.

11. A computer configured to participate in a cloud of computers that host execution units for tenants of the cloud, the computer comprising:
    storage that when powered stores outgoing packets to be transmitted from the computer via a network shared by the computers, where the outgoing packets are generated by traffic sources of virtual machines (VMs) of respective tenants on the computer, the traffic sources residing above the network layer of the computer and comprising either virtual machines, processes, or ports, and wherein the number of traffic sources for a given tenant vary over time according to tenant software executing on the VMs, the storage further storing weights assigned to the tenants, respectively; and
    processing hardware of the computer, the processing hardware regulating per-tenant rate control of transmission for all of the outgoing packets by tracking which packets are associated with which tenant, wherein the transmitting of the packets is based on the total rate of transmission for the outgoing packets, wherein the total rate of transmission is computed to vary according to information indicating a changing condition of the network, wherein the regulating is also performed according to the total rate of transmission and the weights such that each traffic sourcing tenant's packets are transmitted at a respective total tenant-rate according to each traffic sourcing tenant's weight and independent of a number of traffic sources of each tenant and independent of a number of VMs of each tenant, wherein the weights control respective proportional shares of the total rate that are provided for transmission of packets in correspondence with which packets are associated with which tenants, and wherein when outgoing packets of a given tenant are transmitting such that according to the given tenant's rate there is determined to be an unused transmission capacity for the given tenant, the unused transmission capacity is used to transmit outgoing packets of other tenants.

12. A computer according to claim 11, wherein the unused transmission capacity is allocated proportionally according to the predefined rates of the other tenants.

13. A computer according to claim 11, wherein the rate controller is implemented either in a virtual network interface card (NIC) of the computer, wherein the virtual NIC exports a network device interface to a guest virtual machine's network driver, or is implemented along a path traversed by the packets.

14. A computer according to claim 11, wherein the rate controller uses fields in TCP/IP headers to encode loss-detection data.

* * * * *